(12) United States Patent
Miyagi

(10) Patent No.: US 12,159,074 B2
(45) Date of Patent: Dec. 3, 2024

(54) PRINTING CONTROL WITH ATTRIBUTE VALUES IDENTIFYING SETTING VALUES TRANSMITTED TO A PRINTER BASED ON INPUT OPERATIONS AND CORRESPONDING ATTRIBUTE VALUES IDENTIFYING SETTING VALUES TRANSMITTED TO A TERMINAL DEVICE

(71) Applicant: CANON KABUSHIKI KAISHA, Tokyo (JP)

(72) Inventor: Arata Miyagi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/237,026

(22) Filed: Aug. 23, 2023

(65) Prior Publication Data

US 2023/0393790 A1   Dec. 7, 2023

Related U.S. Application Data

(63) Continuation of application No. PCT/JP2022/001395, filed on Jan. 17, 2022.

(30) Foreign Application Priority Data

Mar. 3, 2021   (JP) ................. 2021-033684

(51) Int. Cl.
*G06F 3/12*   (2006.01)

(52) U.S. Cl.
CPC .......... *G06F 3/1255* (2013.01); *G06F 3/1208* (2013.01); *G06F 3/1256* (2013.01);
(Continued)

(58) Field of Classification Search
CPC .... G06F 3/1208; G06F 3/1255; G06F 3/1256; G06F 3/1264; G06F 3/1273;
(Continued)

(56) References Cited

U.S. PATENT DOCUMENTS 7,474,429 B2 *   1/2009   Morooka .............. G06F 3/1204
                                                            358/1.15
7,839,516 B2 *  11/2010   Tomita .................. G06F 3/1205
                                                            700/20
(Continued)

FOREIGN PATENT DOCUMENTS

JP   2016-206827 A   12/2016
JP   2017-068304 A    4/2017
(Continued)

OTHER PUBLICATIONS

PCT International Search Report mailed Apr. 5, 2022, in related PCT Application No. PCT/JP2022/001395.

*Primary Examiner* — Scott A Rogers
(74) *Attorney, Agent, or Firm* — VENABLE LLP

(57) ABSTRACT

A printing control system includes a terminal that performs an input operation of setting a second setting item relevant to printing that is made impossible based on an input operation of setting for a first setting item relevant to printing being performed, and transmits first information to a printing apparatus based on the input operation for the first setting item being performed. The printing apparatus perform control so as to transmit second information to the terminal device as a response to the first information in a case where the printing apparatus receives the first information from the terminal device. Based on the terminal device receiving the second information, a display control unit displays a setting value corresponding to a second attribute value indicated by the second information in association with the second setting item for which the input operation is made impossible.

17 Claims, 6 Drawing Sheets

(52) U.S. Cl.
CPC .......... *G06F 3/1264* (2013.01); *G06F 3/1273* (2013.01); *G06F 3/1285* (2013.01)

(58) Field of Classification Search
CPC .. G06F 3/1285; H04N 1/00405–00482; H04N 1/00501–00506; H04N 1/00567–00679; H04N 1/00912–0096; H04N 1/2307–2392; G06K 15/002–007; G06K 15/1882–1885
See application file for complete search history.

(56) References Cited

U.S. PATENT DOCUMENTS

| | | | |
|---|---|---|---|
| 8,279,467 B2* | 10/2012 | Mitsui | G06F 3/1288 358/1.9 |
| 9,172,832 B2* | 10/2015 | Cho | G06F 3/1258 |
| 9,354,833 B2* | 5/2016 | Kinoshita | G06F 3/1205 |
| 11,093,188 B2 | 8/2021 | Kanai | |
| 2009/0180140 A1* | 7/2009 | Kawamura | G06F 3/1284 358/1.15 |
| 2012/0188574 A1* | 7/2012 | Armstrong | G06F 3/1285 358/1.13 |
| 2014/0333951 A1* | 11/2014 | Yoshida | G06F 3/1205 358/1.13 |
| 2019/0273835 A1* | 9/2019 | Nishii | H04N 1/00307 |
| 2020/0089440 A1* | 3/2020 | Takeo | G06F 3/1205 |
| 2020/0249883 A1* | 8/2020 | Nakata | G06F 3/1257 |
| 2022/0232135 A1* | 7/2022 | Yamanaka | H04N 1/00079 |

FOREIGN PATENT DOCUMENTS

| | | |
|---|---|---|
| JP | 2018-120633 A | 8/2018 |
| JP | 2020-026064 A | 2/2020 |

\* cited by examiner

```
Get-Printer-Attributes:
    attributes-charset (charset) = utf-8
    attributes-natural-language (naturalLanguage) = en
    printer-uri (uri) = ipp://192.168.114.5:631/ipp/print
    requesting-user-name (nameWithoutLaguage) = user
    requested-attributes (keyword) = all
```

FIG.4A

```
    status-code = successful-ok
    attributes-charset (charset) = utf-8
    attributes-natural-language (naturalLanguage) = en
    media-supported  (1setOf keyword)=
'na_letter_8.5x11in' , 'na_legal_8.5x14in' , 'na_executive_7.25x10.5in' , 'na_invoice_5.5x8.5in' , '
na_foolscap_8.5x13in' , 'na_of i cio_8.5x13.4in' , 'na_index-3x5_3x5in', 'na_index-
4x6_4x6in' , ' na_5x7_5x7in'
    media-type-supported  (1setOf keyword)= 'stationery' , 'stationery-lightweight',
'stationery-heavyweight' , 'label' , 'photographic'
    finishings (enum) = none(3), staple(4), trim-after-pages(60), coat(15), laminate(16)
    finishings-col-database(1setOf collection) = { finishing-template = 'cut-after-
pages'}, {finishings-template = 'staple'}, {finishings-tmplate = 'coating'}, {finishings-
template = 'laminating'}, {finishings-template = 'cut_and_coat'}}
```

FIG.4B

```
Validate-Job:
    attributes-charset (charset) = utf-8
    attributes-natural-language (naturalLanguage) = en
    printer-uri (uri) = ipp://192.168.114.5:631/ipp/print
    requesting-user-name (nameWithoutuLangauage) = user
    document-format (mimeMediaType) = image/pwg-raster
    media-col (collection) = {media-size = {x-dimension=21000 y-dimension=29700}
media- type = photographic}
    sides (keyword) = one-sided
    finishings-col (collection) = {fisnishing-template = cut-after-pages}
```

FIG.4C

```
    status-code = successful-ok
    attributes-charset (charset) = utf-8
    attributes-natural-language (naturalLanguage) = en
    additional-info (collection) = { finishings = trim-after-pages}
```

FIG.4D

```
Validate-Job:
    attributes-charset (charset) = utf-8
    attributes-natural-language (naturalLanguage) = en
    printer-uri (uri) = ipp://192.168.114.5:631/ipp/print
    requesting-user-name (nameWithoutLanguage) = user
    document-format (mimeMediaType) = image/pwg-raster
    media-col (collection) = {media-size = {x-dimension = 21000 y-dimension=
29700} media-type = photographic}
    sides (keyword) = one- sided
    finishings (keyword) = coat
```

FIG.5A

```
status-code = successful-ok
attributes-charset (charset) = utf-8
attributes-natural-language (naturalLanguage) = en
additional-info (collection) = finishing-col { finishings-template = coating}
```

FIG.5B

```
Validate-Job:
    attributes-charset (charset) = utf-8
    attributes-natural-language (naturalLanguage) = en
    printer-uri(uri) = ipp://192.168.114.5:631/ipp/print
    requesting-user-name (nameWithoutLanguage) = user
    document-format (mimeMediaType) = image/pwg-raster
    media-col (collection) = {media-size = {x-dimension = 21000 y-dimension=
 29700} media-type = photographic}
    sides (keyword) = one-sided
    finishings-col (collection) = {finishing-template = 'cut_and_coat' }}
```

FIG.5C

```
status-code = successful-ok
attributes-charset (charset) = utf-8
attributes-natural-language (naturalLanguage) = en
additional-info (collection) = { finishings = trim-after-pages, coat}
```

FIG.5D

PRINTING CONTROL WITH ATTRIBUTE VALUES IDENTIFYING SETTING VALUES TRANSMITTED TO A PRINTER BASED ON INPUT OPERATIONS AND CORRESPONDING ATTRIBUTE VALUES IDENTIFYING SETTING VALUES TRANSMITTED TO A TERMINAL DEVICE

CROSS-REFERENCE TO RELATED APPLICATIONS

This application is a Continuation of International Patent Application No. PCT/JP2022/001395, filed Jan. 17, 2022, which claims the benefit of Japanese Patent Application No. 2021-033684, filed Mar. 3, 2021, both of which are hereby incorporated by reference herein in their entirety.

BACKGROUND OF THE INVENTION

Field of the Invention

The present disclosure relates to a printing apparatus, a terminal device, a printing control system, a printing method, a control method, and a storage medium.

Background Art

Japanese Patent Laid-Open No. 2020-26064 describes that a printing apparatus validates whether a prohibition condition is satisfied upon a validation request from a communication terminal to the printing apparatus and returns a validation result to the communication terminal. This discloses that a user is thus accurately notified through the communication terminal of whether the printing apparatus can execute a job.

CITATION LIST

Patent Literature

PTL 1 Japanese Patent Laid-Open No. 2020-26064

SUMMARY OF THE INVENTION

However, in recent years, further improvement in the user operability in printing processing has been demanded. In response to this, the present disclosure provides a printing apparatus, a terminal device, a printing control system, a printing method, a control method, and a storage medium that have excellent user operability.

To this end, a printing control system of the present disclosure is a printing control system including: a terminal device; and a printing apparatus, in which the terminal device includes a first control unit that performs control such that, out of a first setting item and a second setting item displayed on a setting screen relevant to printing, an input operation of setting for the second setting item is made impossible based on a fact that an input operation of setting for the first setting item is performed, a first transmission control unit that performs control so as to transmit first information, which includes a first attribute value that can identify a setting value of the first setting item set based on the input operation as a first attribute corresponding to the first setting item, to the printing apparatus based on the fact that the input operation for the first setting item is performed, and a display control unit, the printing apparatus includes a second transmission control unit that performs control so as to transmit second information, which includes a second attribute value that is an attribute value of a second attribute corresponding to the second setting item and that corresponds to the first attribute value indicated by the first information, to the terminal device as a response to the first information in a case where the printing apparatus receives the first information from the terminal device, and based on a fact that the terminal device receives the second information, the display control unit performs control so as to display a setting value corresponding to the second attribute value indicated by the second information in association with the second setting item for which the input operation is made impossible.

According to the present disclosure, it is possible to provide a printing apparatus, a terminal device, a printing control system, a printing method, a control method, and a storage medium that have excellent user operability.

Further features of the present invention will become apparent from the following description of exemplary embodiments with reference to the attached drawings.

BRIEF DESCRIPTION OF THE DRAWINGS

FIG. 4A is a diagram illustrating communication contents in a first case between the terminal device and the printing apparatus;

FIG. 4B is a diagram illustrating communication contents in the first case between the terminal device and the printing apparatus;

FIG. 4C is a diagram illustrating communication contents in the first case between the terminal device and the printing apparatus;

FIG. 4D is a diagram illustrating communication contents in the first case between the terminal device and the printing apparatus;

FIG. 5A is a diagram illustrating communication contents in second and third cases between the terminal device and the printing apparatus;

FIG. 5B is a diagram illustrating communication contents in the second and the third cases between the terminal device and the printing apparatus;

FIG. 5C is a diagram illustrating communication contents in the second and the third cases between the terminal device and the printing apparatus;

FIG. 5D is a diagram illustrating communication contents in the second and the third cases between the terminal device and the printing apparatus.

DESCRIPTION OF THE EMBODIMENTS

An embodiment of the present disclosure is described below with reference to the drawings.

Figure 1:
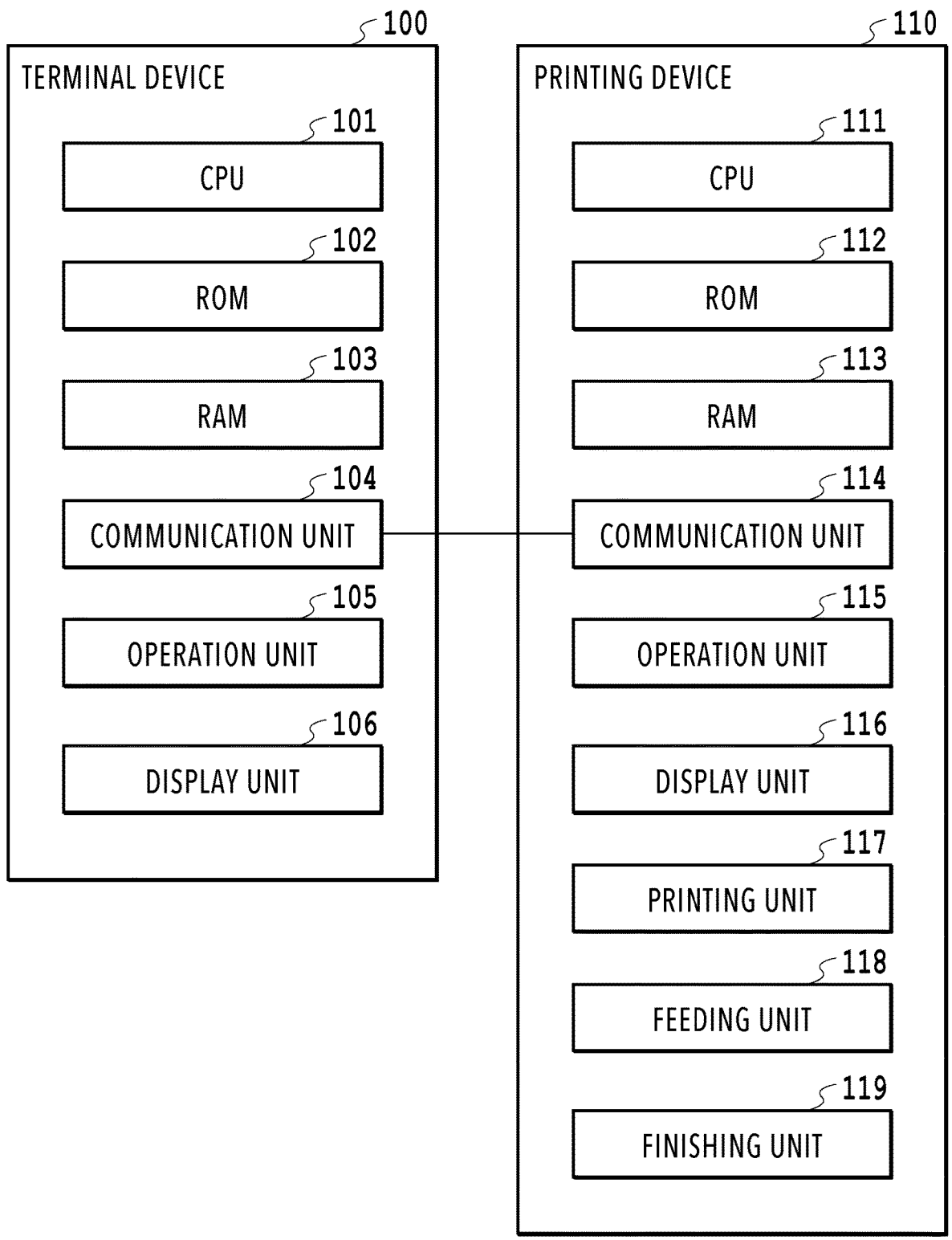
FIG. 1 is a diagram illustrating a configuration of a terminal device and a printing apparatus.

FIG. 1 is a diagram illustrating configurations of a terminal device 100 and a printing apparatus 110 communicable with the terminal device 100 in the present embodiment. The terminal device 100 includes a CPU 101, a ROM 102, a RAM 103, a communication unit 104, an operation unit 105, and a display unit 106. The printing apparatus 110 includes a CPU 111, a ROM 112, a RAM 113, a communication unit 114, an operation unit 115, a display unit 116, a printing unit 117, a feeding unit 118, and a finishing unit 119. The terminal device 100 and the printing apparatus 110 are connected with each other through the communication unit 104 of the terminal device 100 and the communication unit 114 of the printing apparatus 110.

The terminal device 100 is information-processing equipment used by a user and is a smartphone or a personal computer. The CPU 101 is a central processing unit that executes a program stored in the ROM 102. The ROM 102 is a non-volatile memory that stores an operating system and an application program or data such as a document used by the user. The RAM 103 is a volatile memory, and the CPU 101 deploys the program to be executed from the ROM 102 into the RAM 103 to execute. The communication unit 104 is a wired LAN module or a wireless LAN module that is connected with the communication unit 114 of the printing apparatus 110 through a network. The operation unit 105 is a keyboard, a mouse, or a touch panel that transfers an operation by the user to the CPU 101. The display unit 106 is a display device formed of liquid crystal and displays a GUI that is controlled to be displayed by the CPU 101. Note that, the ROM stores later-described printer software, and in a case where the CPU 101 receives an operation for printing from the user, the CPU 101 reads the printer software from the ROM and executes processing based on the printer software.

The CPU 111 of the printing apparatus 110 is a central processing unit that executes a program stored in the ROM 112. The ROM 112 is a non-volatile memory that stores a control program for controlling the printing apparatus 110. The RAM 113 is a volatile memory, and the CPU 111 deploys a program to be executed from the ROM 112 into the RAM 113 to execute. The communication unit 114 is a wired LAN module or a wireless LAN module that is connected with the communication unit 104 of the terminal device 100 through the network. The operation unit 115 is formed of a touch panel and a button and transfers an operation by the user to the CPU 111.

The display unit 116 is a display device formed of liquid crystal. The printing unit 117 includes an ink jet type printer head that ejects ink, an ink supplying unit that supplies ink, and the like and forms an image on a surface of paper fed by the feeding unit 118. The feeding unit 118 can feed cut paper and roll paper and feeds a sheet to the printing unit 117 based on an instruction from the CPU 111. The finishing unit 119 performs finishing processing of the sheet on which the printing is performed by the printing unit 117. The finishing unit 119 includes at least one of a stapler that binds the sheets with a staple by each copy, a cutter that cuts the roll paper at a designated position, and a laminator that lamination-processes the sheet. Additionally, the finishing unit 119 may execute processing to apply a special transparent ink for the purpose of glossing the sheet or improving the weather resistance of the sheet. The processing is executed under control instructed by the CPU 111.

Figure 2A:
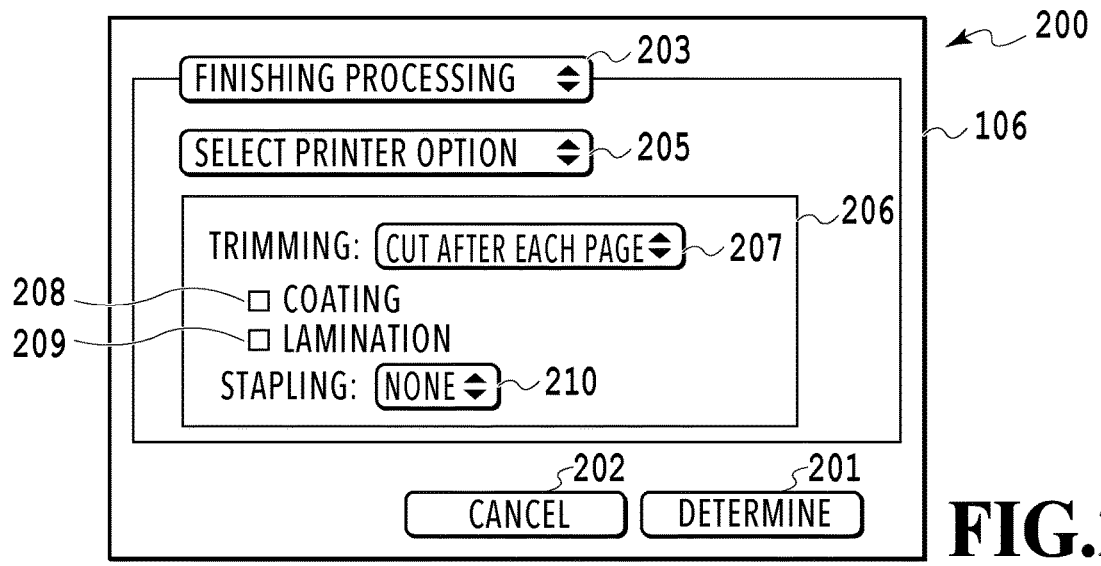
FIG. 2A is a diagram illustrating a setting screen of finishing processing displayed on a display unit of the terminal device.
Figure 2B:
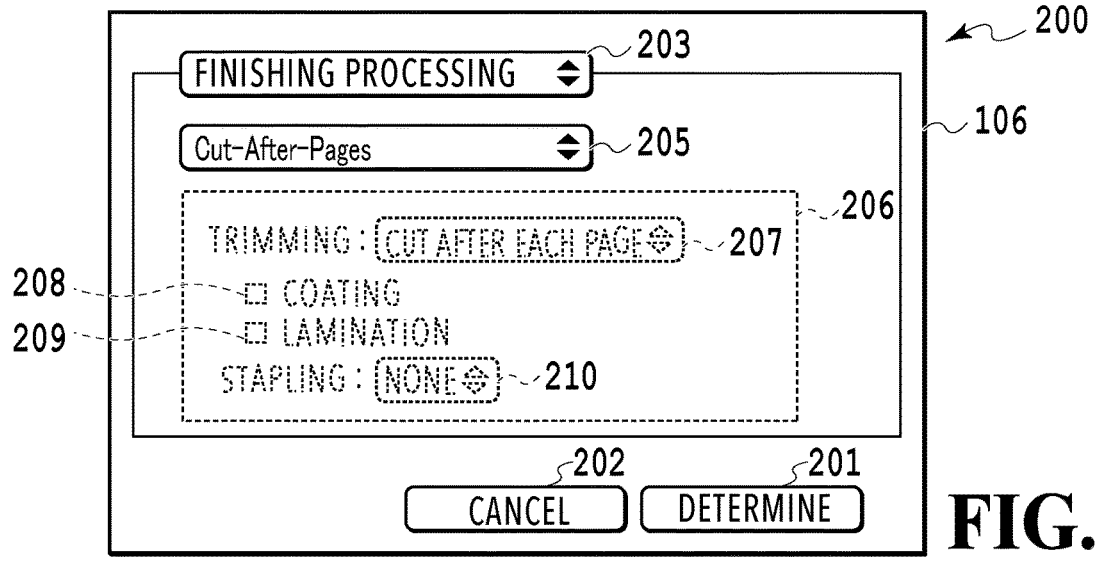
FIG. 2B is a diagram illustrating the setting screen of the finishing processing displayed on the display unit of the terminal device.
Figure 2C:
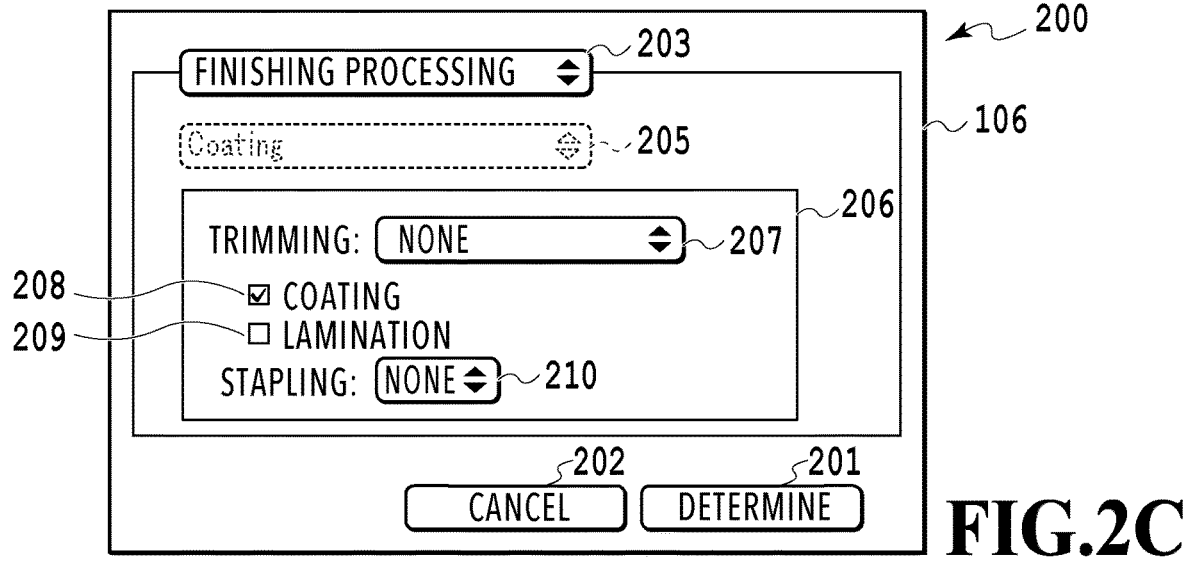
FIG. 2C is a diagram illustrating the setting screen of the finishing processing displayed on the display unit of the terminal device.

FIGS. 2A to 2C are diagrams illustrating a setting screen 200 of the finishing processing displayed on the display unit 106 of the terminal device 100 in the present embodiment. Note that, the screen in each of FIGS. 2A to 2C is displayed based on an instruction to perform the printing in an application and is provided by the printer software installed on the terminal device 100. The printer software provides an instruction to the printing apparatus 110 to perform the printing based on application data generated by the application and printing setting information set by using the setting screen 200. The setting screen 200 is displayed based on an instruction by the user using the operation unit 105 to call a printing screen for the printing instruction. The setting screen 200 includes a determination button 201, a cancel button 202, and a printing setting group tab 203. The printing setting group tab 203 includes a first attribute selection drop-down list 205 and a second attribute setting group 206. Note that, in the present embodiment, an example in which the finishing processing is set as the printing setting group tab 203 is described. Therefore, hereinafter, the first attribute selection drop-down list 205 is referred to as a finishings-col attribute selection drop-down list 205 or simply a drop-down list 205. The second attribute setting group 206 is referred to as a finishings attribute setting group 206 or a setting group 206. The setting group 206 includes a trimming selection drop-list box 207, a coating selection checkbox 208, a lamination processing selection checkbox 209, and a stapling setting drop-list box 210. Note that, these items are merely examples, and not all the items are necessarily included, and any other item may be included.

The determination button 201 is a button for determining printing setting that is currently set. Once the determination button 201 is pressed, a printing job is transmitted from the terminal device 100 to the printing apparatus 110, and the printing apparatus 110 starts the printing with the set printing setting. The cancel button 202 is a button for cancelling the printing instruction. Once the cancel button 202 is pressed, the printing setting processing is canceled, and the process returns to the previous application.

The printing setting group tab 203 is a tab for selecting a setting value group to be set by the printing setting screen. In FIGS. 2A to 2C, "finishing processing" is selected. Once the user presses the printing setting group tab 203, a selection screen of another setting group such as "sheet and quality" and "layout" is displayed. For example, once the user selects "layout", a screen for setting ON/OFF of "double-sided printing" and the number of pages arranged on a surface of the sheet is displayed.

The drop-down list 205 displays an option of the finishing processing to be executed by the printing apparatus 110. The option displayed in the drop-down list 205 includes finishing processing that is a combination of multiple types of finishing processing. Use of the drop-down list 205 allows the user to set the finishing processing easily. In the setting group 206, the user can individually select and combine each type of the finishing processing.

With a pressing operation by the user, the drop-down list 205 displays the option corresponding to a finishings-col-database attribute set in the printing apparatus 110 in advance. In the present embodiment, six options, which are "cut-after-pages", "staple", "coating", "laminating", "cut-and-coat", and "select printer option", are displayed. A number in ( ) following the option indicates an attribute value. The attribute value is an identifier for uniquely identifying each type of finishing processing. As described above, the finishing processing included in the drop-down list 205 includes processing that is a combination of the multiple types of finishing processing. In this case, an attribute value corresponding to the multiple types of finishing processing is associated as the attribute value.

"Cut-after-pages" corresponds to processing to cut roll paper into each page and corresponds to trim-after-pages (60) of a finishings attribute value. "Staple" corresponds to processing to bind printed products with a staple and corresponds to Staple (4) of a finishings attribute value. "Coating" corresponds to processing to execute coating on a printed product and corresponds to Coat (15) of a finishings attribute value. "Laminating" corresponds to processing to execute lamination processing on a printed product and corresponds to Laminate (16) of a finishings attribute value. Additionally, "cut_and_coat" is a combination of the multiple types of finishing processing in which the coating processing and the cutting of roll paper into pages are performed on a printed product. "Cut and coat" corresponds to trim-after-pages (60) and Coat (15) of the finishings attribute values. Additionally, "select printer option" is an option that is selected in a case where no finishings-col attribute is used. A character string to be displayed may be translated into each displayed language by using a character string database. In a case where the user selects any one of "cut-after-pages", "staple", "coating", "laminating", and "cut-and-coat", the printer software sets the selected option as the finishings-col attribute.

The setting group 206 is enabled in a case where "select printer option" is selected from the drop-down list 205. That is, the user is allowed to select each item included in the setting group 206. The setting group 206 relates to the finishings-col attribute, and the user can individually select and combine each type of finishing processing. Additionally, in accordance with a finishings-supported attribute of the printing apparatus 110, the setting group 206 is set based on each attribute value described later.

The trimming selection drop-list box 207 corresponds to the trim-after-pages (60) attribute value and displays options of "none" and "cut after each page". In a case where "cut after each page" is selected, the trim-after-pages (60) attribute value is set to the finishings attribute.

The coating selection checkbox 208 corresponds to the Coat (15) attribute value, and once the coating selection checkbox 208 is checked, the Coat (15) attribute value is set to the finishings attribute. The lamination processing selection checkbox 209 corresponds to the Laminate (16) attribute value, and once the lamination processing selection checkbox 209 is checked, the Laminate (16) attribute value is set to the finishings attribute.

The stapling setting drop-list box 210 corresponds to the staple (4) attribute value and displays "none" and "staple". In a case where "staple" is selected, the Staple (4) attribute value is set to the finishings attribute. In a case where there is no attribute value corresponding to the finishings-supported attribute of the printing apparatus 110, the corresponding item is not displayed. For example, in a case where the finishings-supported attribute of the printing apparatus 110 does not correspond to the attribute value relevant to coating, the checkbox of coating 208 is not displayed in FIG. 2B.

The setting group 206 is available in a case where "select printer option" is selected from the drop-down list 205. In a case where another finishings-col attribute is selected, the printer software colors the entirety of the setting group 206 in gray and indicates to the user that the setting group 206 is not selectable.

Thus, the user can perform setting of the finishing processing based on the finishings-col attribute and the finishings attribute. However, in the display in FIG. 2A, the display may be in multiple ways even in a case of indicating the same finishing processing. For this reason, it is difficult for the user to understand the relationship between the finishings-col attribute and the finishings attribute. For example, in a case where "none" is displayed in the trimming 207 while the user is selecting cut-after-pages from the drop-down list 205, there is a possibility that it is difficult for the user to figure out whether the setting for cutting of sheet is performed appropriately.

To deal with this, in the present embodiment, the printer software updates the screen display based on the relationship between the finishings-col attribute and the finishings attribute after the user changes the printing setting. The method is described below.

Figure 3:
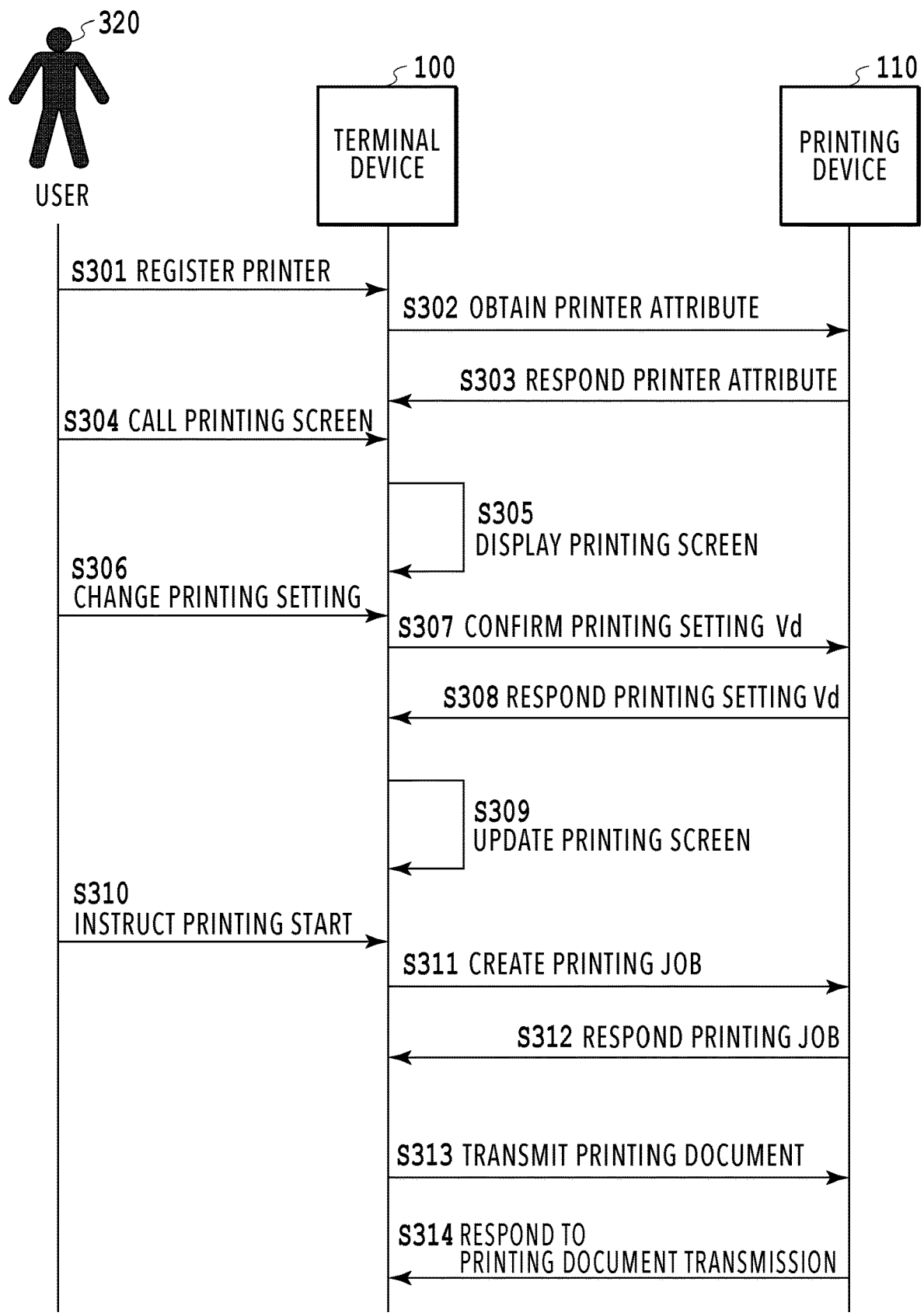
FIG. 3 is a diagram illustrating a sequence of printing processing.

FIG. 3 is a diagram illustrating a sequence of the printing processing in the present embodiment. First, a user 320 operates the operation unit 105 of the terminal device 100 to make an instruction so as to register and make available the printer connected to the network (S301). For example, in a case where the user operates the terminal device 100 and presses a registration button of the printing apparatus, the printer software displays a list of printing apparatuses on a network connected to the terminal device 100. In a case where the printing apparatus is selected from the list, the terminal device 100 that receives the instruction from the user requests obtainment of a printer attribute from the selected printing apparatus 110 through the communication unit 104 (S302). In the IPP protocol, this request is defined as a Get-Printer-Attributes operation, and it is possible to request transmission of various attributes of the printing apparatus.

Once the printing apparatus 110 receives the Get-Printer-Attributes operation, the CPU 111 returns an attribute in accordance with the capability of the printing apparatus (S303). The returned attribute is a size of the sheet available in the printing apparatus 110, a default value thereof, a type of the sheet, a default value thereof, whether double-sided printing is possible, a type of the finishing processing executable by the printing apparatus and a default value thereof, a type and a remaining amount of an ink tank included in the printing apparatus 110, and the like. Note that, the default value indicates a parameter used in a case where the user does not set a setting value for a certain item in the terminal device 100. That is, the default value is a parameter used in a case where there is no setting value for a certain item of the printing job. For example, assuming that the printing apparatus 110 returns A4 size as the default value of the size of the sheet. Then, if there is no setting value for the sheet size of the printing job that the printing apparatus 110 receives from the terminal device 100, the printing processing is executed by using A4 size as the default value.

Thereafter, once the user 320 makes an instruction of printing screen calling as the printing instruction (S304), the terminal device 100 displays a screen for receiving the setting value of the printing (S305). The screen displayed in this process is the screen described with reference to FIG. 2A. Once the user 320 changes the printing setting from the default value on the displayed screen (S306), the terminal device 100 generates a validation job including the printing setting that should be set to a job (including no printing data) and requests the printing apparatus 110 to validate the printing setting (S307). Specifically, the terminal device 100 transmits Validate-Job-Request to the printing apparatus 110.

Once receiving Validate-Job from the terminal device 100, the printing apparatus 110 validates the printing setting value and returns a response to the terminal device 100 (S308).

In the validation of the printing setting, whether each attribute instructed in the printing setting falls under a prohibition condition (a predetermined condition) is determined. Note that, the prohibition condition in the present embodiment indicates a condition in which multiple attributes are not allowed to be set simultaneously. For example, in the present embodiment, a combination of glossy paper and double-sided setting falls under the prohibition condition. That is, this prohibition condition indicates that glossy paper and double-sided setting are not allowed to be set together simultaneously. Additionally, a combination of a user-defined size of sheet size and double-sided setting also falls under the prohibition condition. This prohibition condition indicates that a user-defined size and double-sided setting are not allowed to be set together simultaneously. In this case, once receiving 'Cut-after-pages' of the finishings-col attribute, the printing apparatus 110 construes that it is processing to cut the roll paper into each page.

Once receiving the response of the printing setting, the terminal device 100 updates the printing screen according to details of the validation (S309). The details of an example of the update of the printing screen are described later. Thereafter, once the user presses the determination button 201 (see FIGS. 2A to 2C) to determine the printing setting and makes an instruction to start the printing (S310), the terminal device 100 creates the printing job and transmits to the printing apparatus 110 (S311). Specifically, the terminal device 100 transmits Create-Job-Request to the printing apparatus 110. The printing apparatus 110 that receives Create-Job-Request generates a job object and returns a response to Create-Job to the terminal device 100 (S312).

Once receiving the response to Create-Job, the terminal device 100 transmits a printing document (printing data) to the printing apparatus 110. Specifically, the terminal device 100 transmits Send-Document-Request to the printing apparatus 110 (S313).

Once receiving Send-Document, the printing apparatus 110 prints the document included therein. Then, the printing apparatus 110 performs control to execute the finishing processing according to the finishings attribute or the finishings-col attribute included in Create-Job. The printing apparatus 110 then transmits a response of the printing document to the terminal device 100, and the processing ends. Note that, in the embodiment in FIG. 3, the printing job including the printing setting is transmitted in S311, and the printing data is transmitted in S313. However, the terminal device 100 may transmit the printing job including the printing setting and the printing data in single processing.

FIGS. 4A to 4D are diagrams illustrating communication contents in a first case between the terminal device 100 and the printing apparatus 110 of the present embodiment. In the first case, a case where the user selects the option displayed in the drop-down list 205 is described. That is, it is a case where the user does not change the setting by using the setting group 206.

FIG. 4A illustrates contents of the Get-Printer-Attributes operation transmitted from the terminal device 100 to the printing apparatus 110 in S302 in FIG. 3. A printer-uri attribute indicates a URI of the printing apparatus 110 as a transmission destination. In this case, since a Requested-attributes attribute is all, all the attributes that the printing apparatus 110 has are requested.

FIG. 4B illustrates a part of the response returned from the printing apparatus 110 to the terminal device 100 in S303 in FIG. 3. A media-supported attribute indicates the size of the sheet available in the printing apparatus 110. A media-type-supported attribute indicates a type of the sheet usable by the printing apparatus 110. The finishings attribute indicates the type of the finishing processing executable by the terminal device 100 with a numerical value. In the example in FIG. 4B, none (3) indicates that no finishing processing is executed. Staple (4) indicates that the stapling processing of binding with a staple is executable. Trim-after-pages (60) indicates that the finishing processing to cut the roll paper into each page is executable. Coat (15) indicates that the coating processing is executable. Laminate (16) indicates that the lamination processing is executable. Note that, the numerical values, which are (3), (4), (60), (15), and (16), may also be referred to as an attribute value.

The finishings-col-database attribute indicates a combination of the multiple types of finishing processing executable by the terminal device 100 in a collection type including a finishings-template attribute, which is a character string. 'Cut-after-pages' corresponds to the processing to cut the roll paper into each page. 'Staple' corresponds to the processing of binding with a staple. 'Coating' corresponds to the processing of coating. 'Laminating' corresponds to the processing of lamination processing. Additionally, 'cut_and_coat' corresponds to combining of the multiple types of finishing processing that are the coating processing and also the cutting of the roll paper into each page. Thus, the printing apparatus 110 can express a combination of multiple types of processing by using finishings-template attribute values. According to the attribute values, the terminal device 100 can know what kind of capability that the printing apparatus 110 has.

FIG. 4C illustrates contents of Validate-Job transmitted from the terminal device 100 to the printing apparatus 110 in S307 in FIG. 3. A document-format attribute indicates a format of the printing document (the printing data), and a media-col attribute indicates setting of an output sheet. A side attribute indicates whether the double-sided printing is performed. The finishings-col attribute indicates the finishing processing. Note that, in the present embodiment, the terminal device 100 can designate only either one of the finishings-col attribute and the finishings attribute. Note that, in FIG. 4C, since cut-after-pages is selected from the drop-down list 205 in FIG. 2B, cut-after-pages is designated as illustrated in FIG. 4C.

FIG. 4D illustrates the response to Validate-Job returned from the printing apparatus 110 to the terminal device 100 in S308 in FIG. 3. Based on Validate-Job transmitted from the terminal device 100, the printing apparatus 110 validates whether the set printing setting falls under the prohibition condition. Status-code=successful-ok indicates that the printing setting instructed by Validate-Job does not fall under the prohibition condition and can be executed with no change. As a result of the validation, if there is an attribute that falls under the prohibition condition, the printing apparatus 110 sets status-code=successful-ok-ignored-or-substituted-attributes and executes S308. If the terminal device 100 receives this setting, since the printing setting that is changed in S306 falls under the prohibition condition, the terminal device 100 displays that the printing is inexecutable to notify the user.

An additional-info attribute indicates the finishings attribute corresponding to 'Cut-after-pages' of the finishings-col attribute instructed by Validate-Job. The additional-info attribute is information that is added for the purpose of implementing improvement in the user operability.

Once receiving the response to Validate-Job from the printing apparatus 110, in S309 in FIG. 3, the terminal device 100 changes the display of the trimming selection drop-list box 207 to "cut after each page" based on the additional-info attribute. Additionally, the terminal device changes the display so as to match with the additional-info attribute. As a result, an option that corresponds to the displayed contents in the drop-down list 205 in FIG. 2A is displayed in 207, and thus the operability of the user is improved.

A state of the display unit 116 of the terminal device 100 in this process is illustrated in FIG. 2B. The setting group 206 is displayed in gray color, and the user can recognize that it is in a not-selectable state. Specifically, the display contents as illustrated in FIG. 2B are obtained because the printer software detects that there is a change into cut-after-pages from the option of the printer option in the drop-down list 205 and processes the region of 206 to be grayed out.

Note that, Coat (15) and Laminate (16) are not included in the additional-info attribute in FIG. 4D. Accordingly, if the coating selection checkbox 208 and the lamination processing selection checkbox 209 are checked, the printer software unchecks the checks and updates the screen. Additionally, since staple (4) is not in the additional-info attribute in FIG. 4D as well, the printer software changes the display of the stapling setting drop-list box 210 to "none".

The above changes in the drop-down list 205 provide an effect that the user can intuitively and easily understand that the printing setting is changed, and thus the user operability is improved.

FIGS. 5A and 5B are diagrams illustrating communication contents in a second case between the terminal device 100 and the printing apparatus 110 of the present embodiment, and FIGS. 5C and 5D are diagrams illustrating communication contents in a third case between the terminal device 100 and the printing apparatus 110 of the present embodiment.

In the second case, a case where the user sets the setting value by using the setting group 206 is described. That is, it is a case where the user selects "select printer option" from the drop-down list 205.

FIG. 5A is a diagram illustrating contents of Validate-Job transmitted from the terminal device 100 to the printing apparatus 110 in S307 in FIG. 3. The second case corresponds to a case where the user selects to check the coating checkbox 208, and "select printer option" is selected from the drop-down list 205. As illustrated in FIG. 5A, 'coat' is set to the finishings attribute, and there is no finishings-col attribute.

FIG. 5B is a diagram illustrating the response to Validate-Job returned from the printing apparatus 110 to the terminal device 100 in S308 in FIG. 3. Status-code=successful-ok indicates that the printing setting instructed by Validate-Job does not fall under the prohibition condition and can be executed with no change. The additional-info attribute indicates the finishings-col attribute corresponding to 'coat' of the finishings attribute that is instructed by Validate-Job and sets finishings-template=coating.

Once receiving the response to Validate-Job from the printing apparatus 110, the terminal device 100 changes the drop-down list 205 to coating by the update processing in S309 in FIG. 3.

A state of the display unit 116 of the terminal device 100 in this process is illustrated in FIG. 2C. In the display of the drop-down list 205, the color of the display may be changed (for example, to gray color) to indicate that it is not "select printer option" selected by the user. On the other hand, the drop-down list 205 may display the changed contents, which are "coating is selected", in a blank space on the right of the list while keeping the display of "select printer option" selected by the user. Alternatively, as another display method, a tooltip that is displayed by mouseover may be applied to display the changed contents.

With the above display, coating that is the option corresponding to the displayed contents of the setting group 206 set by the user is displayed in the drop-down list 205, and therefore the user operability is improved.

FIG. 5C is a diagram illustrating contents of Validate-Job transmitted from the terminal device 100 to the printing apparatus 110 in S307 in FIG. 3. A third case is a case where the user selects 'cut_and_coat' from the drop-down list 205. That is, it is a case where an option other than "select printer option" is selected as the finishings-col attribute, and no finishings attribute is used. According to the selection by the user, 'cut-and-coat' is set to the finishings-col attribute. Since the drop-down list 205 is changed to an option different from "select printer option", the setting group 206 of the terminal device 100 (see FIGS. 2A to 2C) is displayed in gray color and is not selectable.

FIG. 5D is a diagram illustrating the response to Validate-Job returned from the printing apparatus 110 to the terminal device 100 in S308 in FIG. 3. Once receiving Validate-Job in S307 in FIG. 3, the printing apparatus 110 generates the additional-info attribute including trim-after-pages and coat as the finishings attribute corresponding to 'cut_and_coat'.

Figure 6:
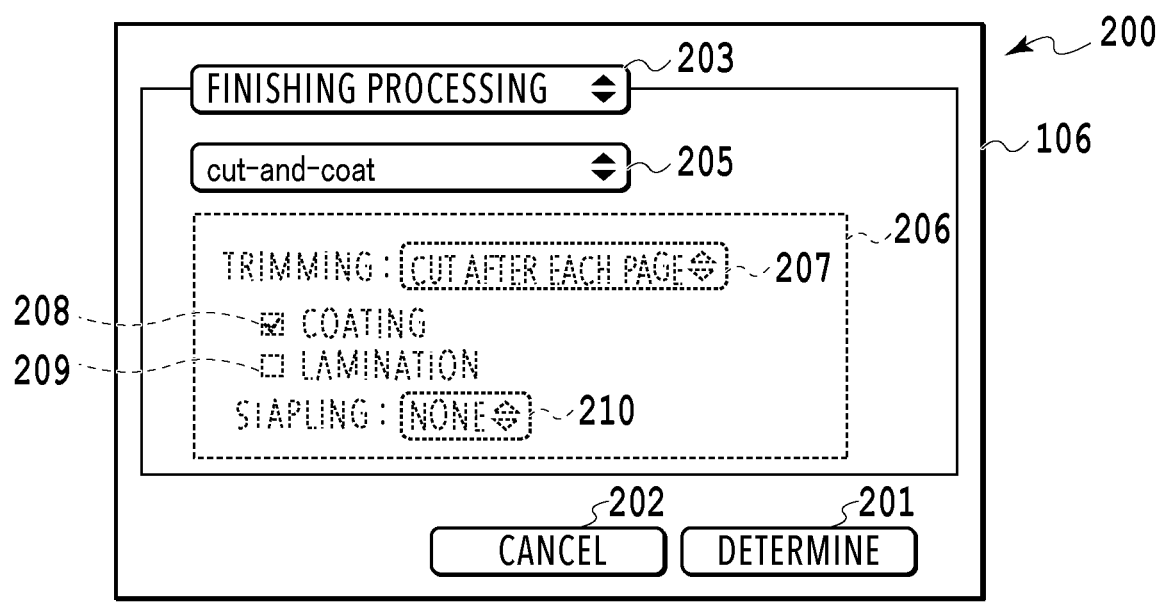
FIG. 6 is a diagram illustrating a setting screen of the finishing processing displayed on the display unit of the terminal device.

Once receiving the response to Validate-Job in S308 in FIG. 3, the CPU 101 changes the display of the trimming selection drop-list box 207 to "cut after each page" based on the additional-info attribute in FIG. 5D. Additionally, since the additional-info attribute in FIG. 5D includes Coat (15), the coating selection checkbox 208 (see FIG. 2C) is checked. Moreover, since the additional-info attribute in FIG. 5D does not include Laminate (16), if the lamination processing selection checkbox 209 is checked, the check is unchecked. Then, the display of the stapling setting drop-list box 210 is changed to "none". A state of the display unit 116 of the terminal device 100 in this process is illustrated in FIG. 6. The setting group 206 is displayed in gray color and kept in the not-selectable state.

With the terminal device 100 updating the screen as described above, the setting value corresponding to cut-and-coat of the drop-down list 205 set by the user is displayed in the setting group 206, and therefore the user operability is improved.

Note that, in the present embodiment, the terminal device 100 that controls the printing by the printing apparatus 110 is referred to as a printing control device. Additionally, in the present embodiment, a combination of the printing apparatus 110 and the terminal device 100 that controls the printing is referred to as a printing system.

Thus, in a case where either one of the finishings-col attribute and the finishings attribute is designated, the display screen is updated based on the other attribute that corresponds to the one attribute. This makes it possible to provide a printing apparatus, a terminal device, a printing control system, a printing method, a control method, and a storage medium that have excellent user operability.

Other Embodiments

The present disclosure can also be implemented by processing in which a program implementing one or more functions of the above-described embodiment is supplied to a system or an apparatus through a network or a storage medium, and one or more processors in a computer of the system or the apparatus read and execute the program.

Additionally, the present disclosure can also be implemented by a circuit (for example, an ASIC) that implements one or more functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A printing control system, comprising:
    a terminal device; and
    a printing apparatus, wherein
    the terminal device includes at least one memory and at least one processor and/or at least one circuit which function as:
        a first control unit configured to perform control such that, out of a first setting item and a second setting item displayed on a setting screen relevant to printing, an input operation of setting for the second setting item is made impossible based on an input operation of setting for the first setting item being performed,
        a first transmission control unit configured to perform control so as to transmit first information, which includes a first attribute value that can identify a setting value of the first setting item set based on the input operation as a first attribute corresponding to the first setting item, to the printing apparatus based on the input operation for the first setting item being performed, and
        a display control unit,
    the printing apparatus includes at least one memory and at least one processor and/or at least one circuit which function as:
        a second transmission control unit configured to perform control so as to transmit second information, which includes a second attribute value that is an attribute value of a second attribute corresponding to the second setting item and that corresponds to the first attribute value indicated by the first information, to the terminal device as a response to the first information in a case where the printing apparatus receives the first information from the terminal device, and
    based on the terminal device receiving the second information, the display control unit performs control so as to display a setting value corresponding to the second attribute value indicated by the second information in association with the second setting item for which the input operation is made impossible.

2. The printing control system according to claim 1, wherein
    the at least one memory of the printing apparatus and the at least one processor of the printing apparatus and/or the at least one circuit of the printing apparatus further function as a processing unit configured to perform printing setting confirmation processing including confirmation on whether printing setting set through the setting screen falls under a prohibition condition based on a validation request received from the terminal device,
    the first transmission control unit controls the first information so as to be transmitted with the validation request, and
    the second transmission control unit controls the second information so as to be transmitted while being included in a response corresponding to the validation request.

3. The printing control system according to claim 1, wherein
    based on the input operation for the first setting item being performed, the display control unit controls the setting screen to be displayed in a display form from which it is possible to identify that the input operation of the setting for the second setting item is made impossible.

4. The printing control system according to claim 1, wherein
    based on the input operation of the setting for the second setting item is being performed, the first control unit performs control so as to make the input operation of the setting for the first setting item impossible.

5. The printing control system according to claim 4, wherein
    based on the input operation for the second setting item being performed, the first transmission control unit performs control so as to transmit third information, which includes a third attribute value that can identify a setting value of the second setting item set based on the input operation as the second attribute corresponding to the second setting item, to the printing apparatus,
    the second transmission control unit performs control so as to transmit fourth information, which includes a fourth attribute value that is an attribute value of the first attribute corresponding to the first setting item and that corresponds to the third attribute value indicated by the third information, to the terminal device as a response to the third information in a case where the printing apparatus receives the third information from the terminal device, and
    based on the terminal device receiving the fourth information, the display control unit performs control so as to display a setting value corresponding to the fourth attribute value indicated by the fourth information in association with the first setting item for which the input operation is made impossible.

6. The printing control system according to claim 1, wherein
the first attribute and the second attribute relate to finishing processing in printing.

7. The printing control system according to claim 1, wherein
the first attribute is one of a finishings-col attribute and a finishings attribute, and the second attribute is the other one of the finishings-col attribute and the finishings attribute.

8. The printing control system according to claim 1, wherein
after receiving the second information, the first transmission control unit performs control to transmit a printing job based on setting contents set through the setting screen to the printing apparatus based on an instruction from a user.

9. A printing apparatus that is communicable with a terminal device including at least one memory and at least one processor and/or at least one circuit that function as
a first control unit configured to perform control such that, out of a first setting item and a second setting item displayed on a setting screen relevant to printing, an input operation of setting for the second setting item is made impossible based on an input operation of setting for the first setting item being performed,
a first transmission control unit configured to perform control so as to transmit first information, which includes a first attribute value that can identify a setting value of the first setting item set based on the input operation as a first attribute corresponding to the first setting item, to the printing apparatus based on the input operation for the first setting item being performed, and
a display control unit,
the printing apparatus comprising:
at least one memory and at least one processor and/or at least one circuit that function as a second transmission control unit configured to perform control so as to transmit second information, which includes a second attribute value that is an attribute value of a second attribute corresponding to the second setting item and that corresponds to the first attribute value indicated by the first information, to the terminal device as a response to the first information in a case where the printing apparatus receives the first information from the terminal device.

10. The printing apparatus according to claim 9, wherein based on the terminal device receiving the second information, the display control unit performs control so as to display a setting value corresponding to the second attribute value indicated by the second information in association with the second setting item for which the input operation is made impossible.

11. The printing apparatus according to claim 9, wherein the at least one memory of the printing apparatus and the at least one processor of the printing apparatus and/or the at least one circuit of the printing apparatus further function as a processing unit configured to perform printing setting confirmation processing including confirmation on whether printing setting set through the setting screen falls under a prohibition condition based on a validation request received from the terminal device, wherein the first transmission control unit controls the first information so as to be transmitted with the validation request, and
the second transmission control unit controls the second information so as to be transmitted while being included in a response corresponding to the validation request.

12. The printing apparatus according to claim 9, wherein the first attribute and the second attribute relate to finishing processing in printing.

13. The printing apparatus according to claim 9, wherein the first attribute is one of a finishings-col attribute and a finishings attribute, and the second attribute is the other one of the finishings-col attribute and the finishings attribute.

14. A terminal device that is communicable with a printing apparatus, comprising:
at least one memory and at least one processor and/or at least one circuit that function as:
a first control unit configured to perform control such that, out of a first setting item and a second setting item displayed on a setting screen relevant to printing, an input operation of setting for the second setting item is made impossible based on an input operation of setting for the first setting item being performed, and
a display control unit configured to perform control so as to display a setting value corresponding to a setting value set to the first setting item in association with the second setting item for which the input operation is made impossible based on a fact that the input operation for the first setting item is performed, wherein
the at least one memory and the at least one processor and/or the at least one circuit further function as:
a first transmission control unit configured to perform control so as to transmit first information, which includes a first attribute value that can identify a setting value of the first setting item set based on the input operation as a first attribute corresponding to the first setting item, to the printing apparatus based on the fact that the input operation for the first setting item is performed; and
a display control unit configured to perform control such that, based on second information including a second attribute value that is an attribute value of a second attribute corresponding to the second setting item and that corresponds to the first attribute value indicated by the first information is being received from the printing apparatus as a response corresponding to the first information being transmitted, a setting value corresponding to the second attribute value indicated by the second information is displayed in association with the second setting item for which the input operation is made impossible.

15. A printing control method of a printing control system including a terminal device and a printing apparatus, comprising:
performing, by the terminal device, control such that, out of a first setting item and a second setting item displayed on a setting screen relevant to printing, an input operation of setting for the second setting item is made impossible based on an input operation of setting for the first setting item being performed;
performing, by the terminal device, control so as to transmit first information, which includes a first attribute value that can identify a setting value of the first setting item set based on the input operation as a first attribute corresponding to the first setting item, to the printing apparatus based on the input operation for the first setting item being performed; and performing, by terminal device, control on a display, and performing, by the printing apparatus, control so as to transmit second information, which includes a second attribute value that is an attribute value of a second attribute corresponding to the second setting item and that corresponds to the first attribute value indicated by the first information, to the terminal device as a response to the first information in a case where the printing apparatus receives the first information from the terminal device, wherein in performing control on the display, based on the terminal device receiving the second information, control so as to display a setting value corresponding to the second attribute value indicated by the second information in association with the second setting item for which the input operation is made impossible is performed.

16. A non-transitory computer-readable storage medium that stores a program which is executable by a printing apparatus that is communicable with a terminal device including at least one memory and at least one processor and/or at least one circuit that function as a first control unit configured to perform control such that, out of a first setting item and a second setting item displayed on a setting screen relevant to printing, an input operation of setting for the second setting item is made impossible based on an input operation of setting for the first setting item being performed, a first transmission control unit configured to perform control so as to transmit first information, which includes a first attribute value that can identify a setting value of the first setting item set based on the input operation as a first attribute corresponding to the first setting item, to the printing apparatus based on the input operation for the first setting item being performed, and a display control unit, the program causing a computer to function as:

a second transmission control unit that performs control so as to transmit second information, which includes a second attribute value that is an attribute value of a second attribute corresponding to the second setting item and that corresponds to the first attribute value indicated by the first information, to a terminal device as a response to the first information in a case where the printing apparatus receives the first information from the terminal device.

17. A method of controlling a printing apparatus that is communicable with a terminal device including at least one memory and at least one processor and/or at least one circuit that function as a first control unit configured to perform control such that, out of a first setting item and a second setting item displayed on a setting screen relevant to printing, an input operation of setting for the second setting item is made impossible based on an input operation of setting for the first setting item being performed, a first transmission control unit configured to perform control so as to transmit first information, which includes a first attribute value that can identify a setting value of the first setting item set based on the input operation as a first attribute corresponding to the first setting item, to the printing apparatus based on the input operation for the first setting item being performed, and a display control unit, the method comprising:

performing control so as to transmit second information, which includes a second attribute value that is an attribute value of a second attribute corresponding to the second setting item and that corresponds to the first attribute value indicated by the first information, to a terminal device as a response to the first information in a case where the printing apparatus receives the first information from the terminal device.

* * * * *